United States Patent
Becker et al.

(10) Patent No.: US 9,024,730 B2
(45) Date of Patent: May 5, 2015

(54) STANDBY ACTIVATION

(75) Inventors: Robert C. Becker, Golden Valley, MN (US); Alan Cornett, Andover, MN (US); David T. Spoor, Eden Prairie, MN (US); Glen Backes, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/603,147

(22) Filed: Sep. 4, 2012

(65) Prior Publication Data

US 2014/0062670 A1    Mar. 6, 2014

(51) Int. Cl.
| | | |
|---|---|---|
| G08B 13/14 | (2006.01) | |
| G06K 7/01 | (2006.01) | |
| G06F 1/00 | (2006.01) | |
| G06K 17/00 | (2006.01) | |

(52) U.S. Cl.
CPC .. G06K 7/01 (2013.01); G06F 1/00 (2013.01); G06K 17/0022 (2013.01)

(58) Field of Classification Search
CPC ............................. G06K 7/01; G06K 17/0022
USPC ................................ 340/10.1–10.5; 455/41.1
See application file for complete search history.

(56) References Cited

U.S. PATENT DOCUMENTS

| | | | |
|---|---|---|---|
| 5,874,902 A * | 2/1999 | Heinrich et al. ............ | 340/10.51 |
| 6,323,566 B1 * | 11/2001 | Meier .......................... | 307/10.2 |
| 6,720,866 B1 * | 4/2004 | Sorrells et al. ............... | 340/10.4 |
| 7,636,031 B2 * | 12/2009 | Mirmobin et al. ........... | 340/10.1 |
| 7,688,182 B2 * | 3/2010 | Nagai ......................... | 340/10.41 |
| 7,852,198 B2 * | 12/2010 | Montgomery et al. ..... | 340/10.51 |
| 8,130,104 B1 * | 3/2012 | Braiman ..................... | 340/572.4 |
| 8,390,433 B2 * | 3/2013 | Warner et al. ................ | 340/10.5 |
| 2005/0212690 A1 * | 9/2005 | Nishikawa ................. | 340/932.2 |
| 2006/0238370 A1 * | 10/2006 | Park et al. ................. | 340/825.49 |
| 2006/0280149 A1 * | 12/2006 | Kuhl et al. ................... | 370/338 |
| 2007/0083604 A1 * | 4/2007 | Zimman et al. .............. | 709/207 |
| 2008/0001720 A1 * | 1/2008 | Tuttle .......................... | 340/10.5 |
| 2008/0079549 A1 * | 4/2008 | Yamada et al. .............. | 340/10.5 |
| 2008/0094245 A1 * | 4/2008 | Hardacker et al. ........ | 340/825.22 |
| 2009/0051486 A1 * | 2/2009 | Denison et al. ............. | 340/5.25 |
| 2010/0079288 A1 * | 4/2010 | Collins et al. .............. | 340/572.4 |
| 2010/0117807 A1 * | 5/2010 | Yokoo ......................... | 340/10.5 |
| 2010/0141397 A1 * | 6/2010 | Kim et al. .................... | 340/10.5 |
| 2010/0308978 A1 * | 12/2010 | Brown ....................... | 340/10.42 |
| 2011/0221571 A1 * | 9/2011 | Koezuka et al. ............. | 340/10.1 |
| 2011/0231650 A1 * | 9/2011 | Coulier ......................... | 713/151 |
| 2012/0030241 A1 * | 2/2012 | Lupoli et al. .................. | 707/780 |
| 2012/0062366 A1 * | 3/2012 | Pappu et al. ................. | 340/10.1 |
| 2013/0005246 A1 * | 1/2013 | Waters et al. ................ | 455/41.1 |

* cited by examiner

*Primary Examiner* — Van Trieu
*Assistant Examiner* — Royit Yu
(74) *Attorney, Agent, or Firm* — Brooks, Cameron & Huebsch, PLLC

(57) ABSTRACT

Systems and methods are provided for providing a standby activation of a device. A method for providing standby activation of a device can include coupling a tag to a computing device. Furthermore, a method for providing standby activation of a device can include activating the tag utilizing a tag reader, wherein activating the tag provides access to the computing device.

17 Claims, 3 Drawing Sheets

STANDBY ACTIVATION

TECHNICAL FIELD

The present disclosure relates to providing standby activation.

BACKGROUND

Radio-frequency identification (RFID) systems can use a number of readers and a number of tags to communicate utilizing various communication protocols. RFID tags can come in a large variety, including passive tags, active tags, and hybrid tags. Each of the various types of tags can use different power sources. For example, active tags can use a continuous power source such as a battery and respond to a low level initiation signal from a reader within a particular range and reply with a high frequency signal. The active tags can interact with readers of very long distances. The hybrid tags can use radio frequency energy to initiate interaction with a reader. The hybrid tags can use internal battery to interact with a reader. A passive tag can be entirely dependent on high level radio frequency energy from a particular reader to provide power for the passive tag's operation. The passive tag can be limited to operation when the passive tag is in contact and/or near contact with a reader. For example, the passive tag can be placed within an excitation field of the particular reader and the radio energy provided by the particular reader can be utilized by the passive tag to provide power to the passive tag and communicate with the particular reader.

DETAILED DESCRIPTION

Figure 1:
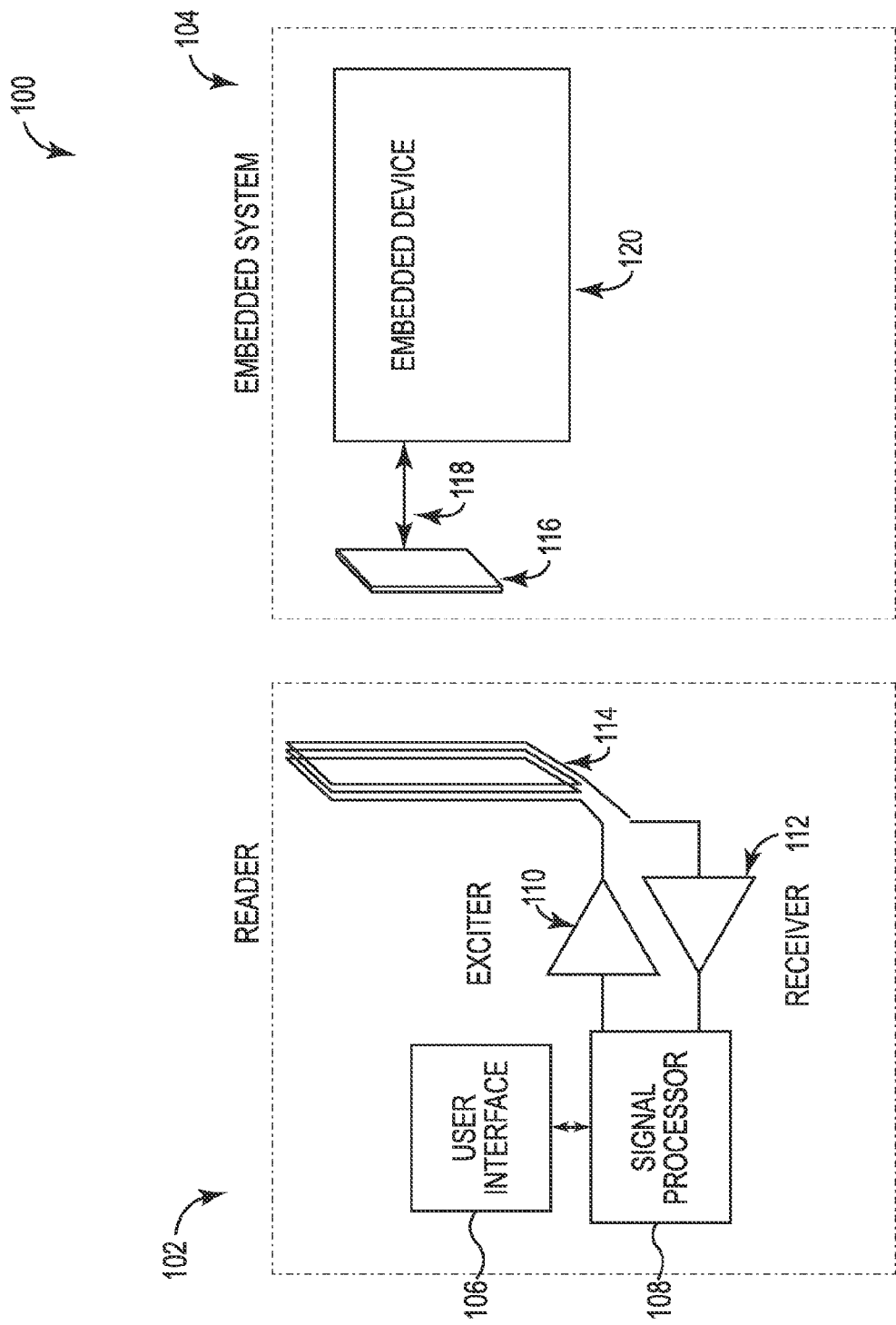
FIG. 1 illustrates an example system for providing standby activation in accordance with one or more embodiments of the present disclosure.

Devices, methods, and systems for providing standby activation are described herein. For example, one or more embodiments can include coupling a tag to a computing device. Furthermore, one or more embodiments can include activating the tag utilizing a tag reader, wherein activating the tag provides access to the computing device.

RFID systems can be utilized to perform a number of functions (e.g., identification, security, etc.). RFID systems can operate utilizing a tag and a tag reader (e.g., reader, etc.) combination. The tag and the reader can communicate utilizing a number of different wireless communication techniques. For example, the tag and the reader can utilize short range radio frequencies to communicate various data (e.g., encryption keys, identification data, security data, etc.).

The tag and reader can also utilize a number of RFID protocols. Each of the number of protocols can utilize a number of unique features. For example, the number of RFID protocols can utilize a number of various modulation methods to transfer data. The number of RFID protocol features can also include a particular order of communication between the tag and the reader (e.g., validation, handshake, etc.).

The particular order of communication can depend on a type of tag (e.g., active, passive, battery assisted passive, etc.) and reader that is being utilized. For example, if the type of tag is a passive tag, the reader can provide an excitation field (e.g., radio frequency energy, etc.) and when the passive tag (e.g., tag capable of receiving radio energy, etc.) is placed within the excitation field the passive tag can utilize the provided energy to initiate communications whereby the reader and the tag may exchange data.

The passive tag may not be connected to a separate electrical power source and can utilize the excitation field to perform various steps of the protocol. The passive tag may not be able to initiate and/or respond to communication of the reader when it is not within the excitation field. For example, the passive tag can be entirely dependent on the radio frequency energy within the excitation field for power (e.g., electrical energy, etc.).

The tag, as described herein, can be embedded into a device (e.g., computing device, etc.). The embedded tag can be utilized to activate and/or deactivate a number of control lines within the computing device. For example, the embedded tag can be coupled to the number of control lines (e.g., power lines, configuration controls, etc.) to enable and/or inhibit the flow of electrical current.

Utilizing the RFID system to activate the computing device can provide a standby activation of the computing device. The standby activation of the computing device can enable secure access to the computing device without the need to provide continuous power to the computing device and/or to a security system of the computing device.

In the following detailed description, reference is made to the accompanying drawings that form a part hereof. The drawings show by way of illustration how one or more embodiments of the disclosure may be practiced. References herein are made to RFID readers and RFID tags in the sense of how these devices are commonly used. In this particular invention, the RFID reader can be used in a capacity as a control device and the RFID tag can be used in a capacity as a controlled device.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of control lines" can refer to one or more control lines.

FIG. 1 illustrates an example system 100 for providing standby activation in accordance with one or more embodiments of the present disclosure. The system 100 can include a reader 102 and an embedded system 104.

The reader 102 can be an RFID reader as described herein. The reader can include a user interface 106. The user interface 106 can be utilized to input a number of selections into the reader 102. For example, the user interface 106 can be utilized to input identification information to access a number of functions of the reader 102. The user interface 106 can be utilized to input data into the reader 102 and/or for communicating data (e.g., transferring data, etc.) to the embedded system 104.

The user interface 106 can be communicatively connected to a signal processor 108. The signal processor 108 can produce a number of communication signals (e.g., radio frequency fields of 125 kHz and/or 13.56 MHz, etc.) utilizing an exciter 110 to communicate with a tag 116 within the embedded system 104. The signal processor 108 can also receive a number of communication signals (e.g., radio frequencies, various modulation types, etc.) utilizing a receiver 112.

The signal processor 108 can also produce an excitation field utilizing the exciter 110. The excitation field can include an area surrounding the reader 102 where a tag (e.g., tag 116, etc.) can utilize radio frequency energy from the reader 102. For example, the tag 116 can require electrical energy for initiating and/or receiving communication from the reader 102. The excitation field can provide the electrical energy to enable the tag 116 to initiate and/or receive communication with the reader 102.

The signal processor 108 can transmit the communication signals using an excitation field generated by exciter 110 utilizing an antenna 114. The antenna 114 can be a single antenna and/or multiple antennas to transmit and/or receive the communication signals and to produce the excitation field. The antenna 114 can include a short range antenna (near field), long range antenna (far field) and/or a combination of a short range antenna and a long range antenna.

The excitation field can be an area surrounding the reader 102 where a radio frequency energy transfer can occur between the reader 102 and the tag 116 within the embedded system 104. A coil within the tag 116 can absorb and/or store energy from the radio frequency energy transfer when within the excitation field.

The embedded system 104 can include the tag 116 communicatively coupled 118 to an embedded device 120. The tag 116 can include a coil that can receive energy from the radio frequency energy transfer when the tag 116 is within the excitation field of the reader 102.

The tag 116 can convert the radio frequency energy to provide electrical energy to a number of components within the tag 116. For example, the tag 116 can utilize a rectifier to convert the resonant energy to direct current (e.g., unidirectional flow of electric charge, etc.). The electrical energy can power an integrated circuit (e.g., application specific integrated circuits, etc.). The integrated circuit can be utilized to communicate with the reader 102 (e.g., validation process, etc.) and/or perform a number of functions as described herein.

The embedded device 120 can include a computing device (e.g., computing device 330, etc.) as described herein. The embedded device can be utilized to control a device, transfer data, and/or perform a number of functions (e.g., security system, irrigation systems, heating ventilation and air conditioning (HVAC) systems, etc.). For example the embedded device can be a computing device that controls a number of security settings for a building. In this example, the embedded computing device can function to change passwords to the alarm system, change the time when security lights turn on, etc.

The tag 116 can be communicatively coupled to a number of control lines 118 for the embedded device 120. The number of control lines 118 can include power lines and/or communication lines of the embedded device 120. Being communicatively coupled to the number of control lines 118 for the embedded device 120 can enable the tag 116 to enable and/or disable a particular functionality of the number of control lines 118 as well as modify the behavior of device 120 by transferring information to device 120. Device 120 can also transfer data to device 116 via control lines 118 to indicate the status or other properties of device 120.

The number of control lines 118, as described herein, can include a number of power lines of the embedded device 120. For example, the number of power lines can provide electrical power to operate the embedded device 120. The tag 116 can enable and/or disable the number of power lines of the embedded device 120 (e.g., turning the embedded device 120 on and/or turning the embedded device 120 off, etc.). For example, the number of power lines can be connected to a power supply (e.g., battery, electrical grid, etc.) and the tag 116 can enable and/or disable the connection to the power supply.

The number of power lines of the embedded device 120 can also utilize the excitation field of the reader 102 to provide power to the embedded device 120. For example, the number of power lines can absorb and/or store electrical energy from the excitation field. In the same example, the tag 116 can enable and/or disable the power lines of the embedded device 120 to control the flow of electrical power to the embedded device.

The number of control lines 118, as described herein, can also include a number of communication lines (e.g., Ethernet, electronic bus, etc.). The number of communication lines can be utilized as a communication path (e.g., communication path 336, etc.) to transfer data to and/or from the embedded device 120. The tag 116 can enable and/or disable a number of capabilities and/or the number of communication lines for the embedded device 120. Disabling the number of capabilities and/or the number of communication lines can alter the behavior of the embedded device 120. For example, if the embedded device 120 were an access control device for a building, the tag 116 can send messages via communications lines 118 that can disable the access device when the tag 116 is within the excitation field of the reader 102. In the same example, the tag 116 can send a message to the embedded device 120 via communication lines 118 that enabled the access control device for the building.

The communication of the reader 102 and/or different computing device with the embedded device can include a variety of communication (e.g., information and/or data, etc.). For example, the communication can include the reader 102 and/or different computing device transferring data (e.g., updates, setting changes, instructions, modules, etc.) to the embedded device 120. The different computing device can be a remote computing device (e.g., in a remote location outside the excitation field of the reader 102, etc.). The remote computing device can communicate with the embedded device 120 using the control lines 118 of the embedded device 120 when the control lines 118 are enabled by the tag 116. For example, the reader 102 can be placed in close proximity (e.g., within the excitation field, etc.) to the tag 116 and the tag 116 can enable the control lines 118 of the embedded device 120 and the remote computing device can be allowed to communicate with the embedded device 120.

The communication between the reader 102 and/or a different computing device can include encryption of the communication (e.g., encryption of the data transferred, etc.). For example, encryption can include a hashing algorithm and/or other form of data encryption.

Enabling and/or disabling the control lines 118 of the embedded device can include a validation process between the reader 102 and the tag 116. For example, the reader 102 and the tag 116 can exchange a number of encryption keys and/or encrypted tokens to validate the other. In this example, the reader 102 can validate the tag 116 and the tag 116 can validate the reader 102. The exchange of the number of encryption keys (e.g., hand shake, etc.) can include a number of different RFID protocols. For example, the RFID protocol used by the reader 102 and the tag 116 can determine the radio frequency and/or modulation type used, the order of the exchange, the type of encryption used, etc. The exchange can be a challenge-response communication between the tag 116 and the reader 102. The challenge-response communication can include the tag 116 sending a token to the reader 102 (e.g., challenge, etc.) and in response the reader 102 can send an encryption token and/or response to the tag 116 for validation. Similarly, the tag 116 can send an encrypted token to the reader 102 and the reader 102 can respond to tag 116 with the decrypted token.

The type of protocol and the encryption key used can be determined based on a level of security desired. For example, if the level of security is low, the encryption method can be relatively simple. An example embodiment of a simple encryption can include performing an exclusive-OR (e.g., logical operation exclusive disjunction, etc.) of the encryption key with the data. In another example, if the level of security is high, multiple encryption keys using much more complex encryption algorithms, such as Data Encryption Standard (DES), Advanced Encryption Standard (AES), skipjack (e.g., block cipher, etc.), or blowfish (e.g., symmetric block cipher, etc.) can be utilized to minimize the probability of unauthorized use. Using different encryption methods for each level of access can be another example embodiment of high security encryption.

The validation process can enable access to an encrypted system of the embedded device. For example, the validation process can enable access to encrypted software (e.g., password protected, etc.) of the embedded device. If the reader 102 and the tag 116 are validated, access can also be granted to the encrypted software of the embedded device.

The validation process can be utilized with the encryption of the data being transferred. For example, the reader 102 and the tag 116 can perform a validation process as described herein. In the same example, data transferred from a different computing device to the embedded device 120 can also be encrypted data. The validation of the reader 102 and encryption of the data transferred can add additional security to the embedded system 104 when used together.

The embedded device 120 can be automatically deactivated if the reader 102 is removed from close proximity with the tag 116. For example, the reader can be removed from the area of the tag 116 and can remove the tag 116 from the excitation field. Removing the tag 116 from the excitation field can deactivate the tag 116 by removing the electrical energy provided by the excitation field. Deactivating the tag can disable the coupled control lines 118. This can provide additional security by ensuring that if the authorized user of the reader 102 leaves the area of the embedded system 104, the control lines of the embedded device 120 are disabled and can restrict access to unauthorized users.

The embedded device 120 can complete the communication (e.g., data transfer, etc.) if the communication was initiated when the tag 116 was within the excitation field of the reader 116. The automatic deactivation can apply to communication that was not initiated while the tag 116 was within the excitation field of the reader 102. This can ensure that the communication is completed, even if the user takes the reader 102 away from the tag 116 (e.g., tag 116 is no longer within the excitation field, etc.). This can also avoid any problems with partial updates and/or partial communications. The embedded device can be deactivated, as described herein, after the communication is complete.

The tag 116 can be utilized to activate or deactivate an embedded device 120 (e.g., computing device, etc.) with a limited power supply (e.g., battery, no power supply, connected to a grid that is attempting to conserve electrical energy, etc.) communicating with and commanding the embedded device 120 using tag 116 when tag 116 is within the excitation field of the reader 102. The embedded system 104 may not consume any of the limited power supply of the embedded device 120 attempting to determine if activation or deactivation commands are forthcoming when the reader 102 is not present. In this example, the tag 116 can act as a zero standby current control interface to embedded device 120.

The embedded system 104 can be utilized to increase security of an embedded device 120 that is in an unsecure location. For example, the embedded device 120 can be located in an area that can be accessed without security by unauthorized users. The embedded system 104 can increase the security of the embedded device 120 by the validation process and/or utilizing encrypted data transfers as described herein.

Figure 2:
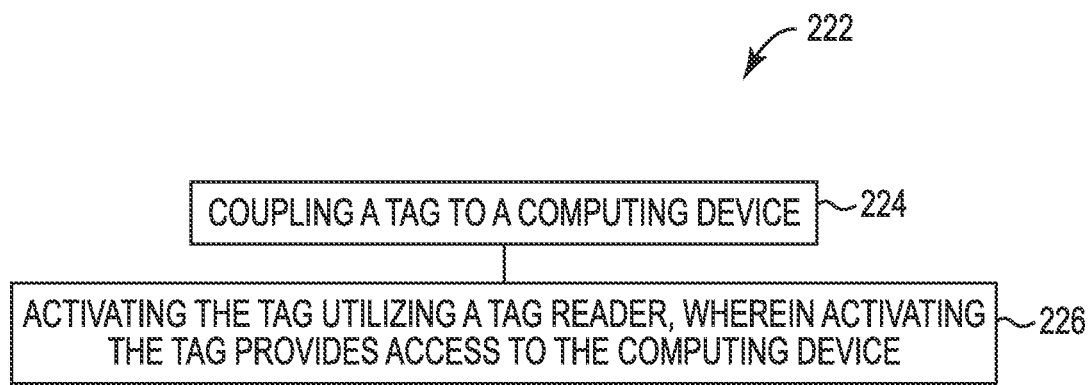
FIG. 2 illustrates a flow diagram of a method for providing standby activation of a device in accordance with one or more embodiments of the present disclosure.

FIG. 2 illustrates a flow diagram of a method 222 for providing standby activation of a device in accordance with one or more embodiments of the present disclosure. Standby activation, as described herein, can include activation of the device (e.g., embedded device 120, etc.) with little and/or no power consumption by the tag (e.g., tag 116) when the reader (e.g., reader 102) is not present.

At 224 a tag is coupled to a computing device. As described herein the tag can be coupled to a number of control lines of the computing device (e.g., device, embedded device 120, etc.). The number of control lines can include a number of power lines and/or a number of communication lines of the computing device.

The computing device can be connected to a power source and/or utilize power from the reader. As described herein the reader can utilize an activation zone to transfer radio energy to a receiving device (e.g., tag, embedded device, etc.). In another example, the reader can be physically connected (e.g., electrical connection, etc.) to the computing device and the reader can act as a temporary power supply for the computing device. If the computing device is connected to a power source other than the reader (e.g., electricity grid, battery power, etc.), then the tag can enable and/or disable the number of power lines connecting the computing device to the power source. If the computing device utilizes electrical power from the reader, the tag can enable and/or disable the number of power lines connecting the computing device and the electrical power provided by the reader.

As described herein, the tag can also be connected to the number of communication lines. The number of communication lines can be enabled and/or disabled by the tag to control incoming and/or outgoing communication with the computing device.

At 226 the tag is activated by the radio frequency energy from a tag reader, wherein activating the tag provides an initial response to the reader indicating the presence of the tag. Activating the tag can include placing the tag within an excitation area of the tag reader. The excitation area can provide electrical energy to the tag and enable circuitry (e.g., various forms of transistor logic, application specific integrated, etc.) within the tag to begin a validation process with the reader.

The tag and the reader can perform the validation process in a number of ways based on a protocol. The validation process can ensure that a user is authorized to communicate with the computing device. The validation process can utilize a number of encrypted keys within the reader and/or the tag to validate that the user of the reader is authorized to communicate with the computing device. If the validation process is successful (e.g., the reader is validated, the user is authorized, etc.) then the tag can be activated and access to the computing device can be given to the user of the tag reader. The reader can indicate to the user that a valid tag is present upon a successful completion of the validation process.

Commands from the user interface (e.g., user interface 106, etc.) can be transferred to the tag upon a successful completion of the validation process. The tag can confirm that the commands from the user interface are complete and/or correct. The tag can communicate the commands to the embedded system (e.g., embedded system 120, etc.). The embedded system can send an acknowledgement of the receipt of the commands from the tag. Upon receipt of the acknowledgement from the embedded system, the tag can communicate to the reader that the embedded system has received the commands.

The signal processor (e.g., signal processor 108, etc.) can indicate to the user interface that the embedded system has successfully received the commands. The reader can be decoupled from the tag and the tag can be shut down (e.g., powered off, etc.) if the reader is no longer providing power to the tag.

Commands communicated to the computing device can include providing electrical power to the computing device. For example, if the tag is coupled to the number of power lines within the computing device, the activated tag can enable the power lines and start the computing device. Access to the computing device can also include providing communication access to the computing device. For example, if the tag is coupled to the number of communication lines of the computing device, the activated tag can enable the communication lines of the computing device and allow the tag reader and/or a different computing device to communicate with the computing device coupled to the tag.

The user of the tag reader can automatically deactivate the tag by removing the tag from the excitation field of the tag reader. For example, the user of the tag reader can remove the tag reader from the location of the tag. Removing the tag reader from the location of the tag can remove the tag from the excitation field and the tag can lose the electrical energy provided by the excitation field. This can deactivate the tag and also disable the connection lines (e.g., power lines, communication lines, etc.).

The method 222 can reserve electrical power for a computing device and/or provide security for a computing device located in an unsecure area.

Figure 3:
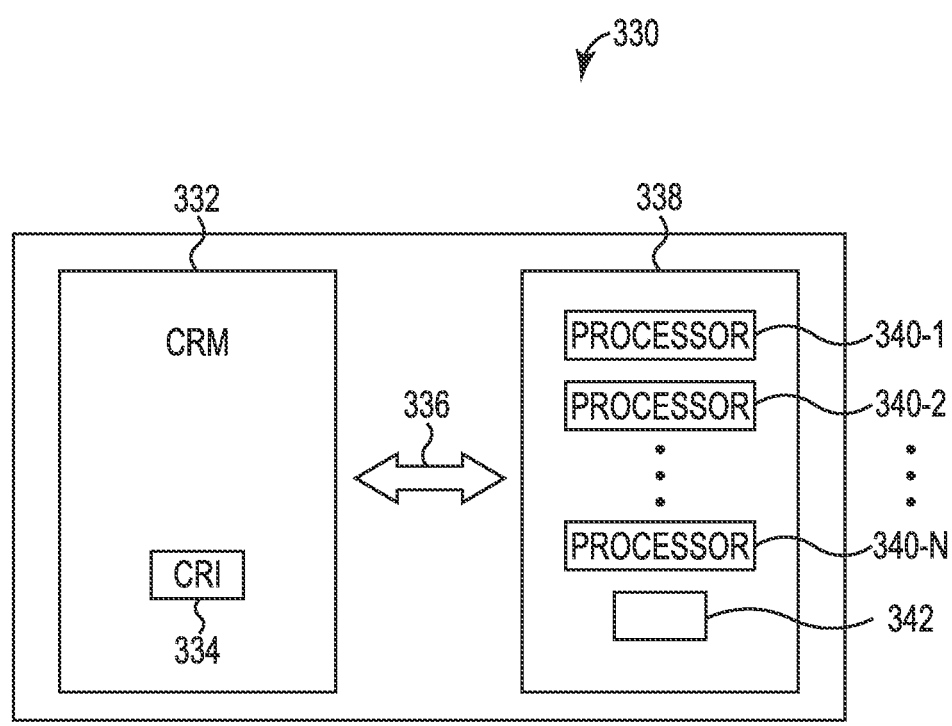
FIG. 3 illustrates a block diagram of an example of a computing device in accordance with one or more embodiments of the present disclosure.

FIG. 3 illustrates a block diagram of an example of a computing device 330 in accordance with one or more embodiments of the present disclosure. The computing device 330, as described herein, can also include a computer readable medium (CRM) 332 in communication with processing resources 340-1, 340-2, . . . , 340-N. CRM 332 can be in communication with a device 338 (e.g., a Jave® application server, among others) having processor resources 340-1, 340-2, . . . , 340-N. The device 338 can be in communication with a tangible non-transitory CRM 332 storing a set of computer-readable instructions (CRI) 334 (e.g., modules, etc.) executable by one or more of the processor resources 340-1, 340-2, . . . , 340-N, as described herein. The CRI 334 can also be stored in remote memory managed by a server and represent an installation package that can be downloaded, installed, and executed. The device 338 can include memory resources 342, and the processor resources 340-1, 340-2, . . . , 340-N can be coupled to the memory resources 342.

Processor resources 340-1, 340-2, . . . , 340-N can execute CRI 334 that can be stored on an internal or external non-transitory CRM 332. The processor resources 340-1, 340-2, . . . , 340-N can execute CRI 334 to perform various functions. For example, the processor resources 340-1, 340-2, . . . , 340-N can execute CRI 334 to perform a number of functions (e.g., communicate with the reader 102, etc.). A non-transitory CRM (e.g., CRM 332), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 332 can also include distributed storage media. For example, the CRM 332 can be distributed among various locations.

The non-transitory CRM 332 can be integral, or communicatively coupled, to a computing device, in a wired and/or a wireless manner. For example, the non-transitory CRM 332 can be an internal memory, a portable memory, a portable disk, or a memory associated with another computing resource (e.g., enabling OR's to be transferred and/or executed across a network such as the Internet).

The CRM 332 can be in communication with the processor resources 340-1, 340-2, . . . , 340-N via a communication path 336. The communication path 336 can be local or remote to a machine (e.g., a computer) associated with the processor resources 340-1, 340-2, . . . , 340-N. Examples of a local communication path 336 can include an electronic bus internal to a machine (e.g., a computer) where the CRM 332 is one of volatile, non-volatile, fixed, and/or removable storage medium in communication with the processor resources 340-1, 340-2, . . . , 340-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 336 can be such that the CRM 332 is remote from the processor resources e.g., 340-1, 340-2, . . . , 340-N, such as in a network relationship between the CRM 332 and the processor resources (e.g., 340-1, 340-2, . . . , 340-N). That is, the communication path 336 can be a network relationship. Examples of such a network relationship can include a local area network (LAN), wide area network (WAN), personal area network (PAN), and the Internet, among others. In such examples, the CRM 332 can be associated with a first computing device and the processor resources 340-1, 340-2, . . . , 340-N can be associated with a second computing device (e.g., a Jave® server, etc.) . . . .

As described herein, a "module" can include computer readable instructions (e.g., CRI 334) that can be executed by a processor to perform a particular function. A module can also include hardware, firmware, and/or logic that can perform a particular function.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for providing a standby activation system, comprising:
   coupling a passive tag to a computing device, wherein coupling the passive tag includes connecting the passive tag to a number of control lines to manipulate a functionality of the computing device via a tag reader, wherein the control lines include a number of communication lines to transfer data to and receive data from the computing device via the tag reader;
   activating the passive tag utilizing the tag reader by placing the excitation field of the reader within an area of the passive tag, wherein activating the passive tag enables the computing device, enables encrypted communication between the tag reader and the passive tag via the tag reader, and provides the encrypted communication from the passive tag to the computing device via the tag reader;
   deactivating the passive tag by removing the excitation field of the reader from the area of the passive tag; and
   completing a communication between the computing device and the tag reader after deactivating the passive tag when the communication is started at a time when the excitation field of the reader is within the area of the passive tag.

2. The method of claim 1, wherein the method includes communicating a number of commands from the reader to the passive tag using encrypted communication.

3. The method of claim 2, wherein the number of commands are transferred from the passive tag to the computing device.

4. The method of claim 1, wherein activating the passive tag comprises utilizing electromagnetic fields from the reader to provide electrical energy to the passive tag.

5. The method of claim 1, wherein activating the passive tag comprises utilizing a contactless communication system.

6. The method of claim 1, further comprising deactivating the Passive tag by removing the passive tag from an excitation field.

7. A system for standby activation, the system comprising:
   a first computing device;
   a passive tag coupled to the first computing device; and
   a reader to activate the passive tag communicatively coupled to the first computing device, wherein activating the passive tag comprises:
      placing the excitation field of the reader within an area of the passive tag;
      providing electrical energy to activate the passive tag;
      manipulating a functionality of the first computing device via control lines, wherein the control lines include a number of communication lines to transfer data to and receive data from the first computing device;
      providing encrypted communication between the reader and the passive tag;
      transferring a command from the reader to the passive tag;
      transferring the command from the passive tag to the computing device;
      providing electrical energy to enable the first computing device;
      providing a second computing device encrypted access to the first computing device;
      deactivating the passive tag by removing the excitation field of the reader from the area of the passive tag; and
      completing a communication between the first computing device and the tag reader after deactivating the passive tag when the communication is started at a time when the excitation field of the reader is within the area of the passive tag.

8. The system of claim 7, wherein the reader changes a number of settings of the first computing device.

9. The system of claim 7, wherein the reader utilizes radio-frequency electromagnetic fields to activate the passive tag and provide electrical energy to the passive tag.

10. The system of claim 7, wherein the passive tag is not connected to a power resource.

11. A system for standby activation, the system comprising:
   a passive tag coupled to a first computing device, wherein the passive tag comprises an antenna to accept a radio frequency energy transfer, wherein the passive tag is coupled to a number of control lines to manipulate a functionality of the first computing device, wherein the control lines include a number of communication lines to transfer data to and receive data from the first computing device;
   a reader capable of activating the passive tag by providing the radio frequency energy transfer when the passive tag is within an excitation field, wherein activating the passive tag enables encrypted communication between the tag reader and the tag, and provides the encrypted communication from the tag to the first computing device; and
   a second computing device capable of transferring and receiving data with the first computing device when the passive tag is activated, wherein communication between the first computing device and the tag reader is completed after the passive tag is deactivated during the communication when the communication is started at a time when the excitation field of the reader is within the area of the passive tag.

12. The system of claim 11, wherein the radio frequency energy transfer supplies electrical energy for operation of the tag and access to the first computing device.

13. The system of claim 11, wherein the second computing device transfers data to the first computing device in response to activating the passive tag.

14. The system of claim 11, wherein the data is encrypted for transferring and receiving between the first computing device and the second computing device.

15. The system of claim 11, wherein the reader performs a validation of the passive tag and the activated passive tag performs a validation of the reader.

16. The system of claim 15, wherein the validation includes a challenge-response communication between the passive tag and the reader, wherein the passive tag and the reader each incorporate an encryption key.

17. The system of claim 11, wherein the second computing device can complete transferring and receiving of data if the passive tag is outside the excitation field of the reader after an initiation of the transfer and receiving of data.

* * * * *